(12) United States Patent
Lin et al.

(10) Patent No.: US 6,175,790 B1
(45) Date of Patent: Jan. 16, 2001

(54) VEHICLE YAW RATE CONTROL WITH YAW RATE COMMAND LIMITING

(75) Inventors: William Chin-Woei Lin, Troy; Youssef Ahmed Ghoneim, Macomb Township, Macomb County; David Michael Sidlosky, Huntington Woods; Hsien Heng Chen; Yuen-Kwok Chin, both of Troy, all of MI (US)

(73) Assignees: General Motors Corporation, Detroit; Delphi Technologies Inc, Troy, both of MI (US)

( * ) Notice: Under 35 U.S.C. 154(b), the term of this patent shall be extended for 0 days.

(21) Appl. No.: 09/138,737

(22) Filed: Aug. 24, 1998

(51) Int. Cl.$^7$ ........................................................ B60T 8/32
(52) U.S. Cl. ............................... 701/36; 303/146; 701/72
(58) Field of Search .................................. 701/1, 36, 48, 701/70, 71, 72, 73; 303/140, 146, 147, 155, 191

(56) References Cited

U.S. PATENT DOCUMENTS

| | | | |
|---|---|---|---|
| 4,834,205 | 5/1989 | Mizuno et al. | 180/141 |
| 5,063,514 | 11/1991 | Headley et al. | |
| 5,172,961 | 12/1992 | Inoue et al. | |

(List continued on next page.)

FOREIGN PATENT DOCUMENTS 41 23 235 C1  11/1992 (DE).
41 21 954 A1   1/1993 (DE).

(List continued on next page.)

OTHER PUBLICATIONS

May The Cornering Force Be With You; Popular Mechanics; Dec. 1995, pp. 74–77.
Stable As She Goes; Don Sherman, Automotive Industries, May 1995.
The Spin Doctors: Don Sherman, Popular Science, Dec. 1995.
Mercedes/Bosch ESP; Automotive Industries, Apr. 1995.
Controlling Vehicle Stability; Christopher A. Sawyer, Automotive Industries, Jan. 1995.

(List continued on next page.)

Primary Examiner—William A. Cuchlinski, Jr.
Assistant Examiner—Edward Pipala
(74) Attorney, Agent, or Firm—Anthony Luke Simon

(57) ABSTRACT

An improved closed-loop vehicle yaw control in which a yaw rate limit based on measured lateral acceleration is used during transient steering maneuvers to dynamically limit a desired yaw rate derived from driver steering input. A preliminary yaw rate limit is computed based on the measured lateral acceleration, and a dynamic yaw rate limit having a proper phase relationship with the desired yaw rate is developed based on the relative magnitudes of the desired yaw rate and the preliminary yaw rate limit. A two-stage process is used to develop the dynamic yaw rate limit. A first stage yaw rate limit is determined according the lower in magnitude of the desired yaw rate and the preliminary yaw rate limit, and a second stage yaw rate limit (i.e., the dynamic yaw rate limit) is determined according to the relative magnitudes of (1) the desired yaw rate and the second stage yaw rate limit, and (2) the first stage yaw rate limit and the second stage yaw rate limit. The desired yaw rate, as limited by the dynamic yaw rate limit, is then combined with the actual or estimated yaw rate to form a yaw rate error, which in turn, is used to develop a yaw rate control command for the vehicle.

8 Claims, 4 Drawing Sheets

U.S. PATENT DOCUMENTS

| | | |
|---|---|---|
| 5,229,944 | 7/1993 | Yasuno . |
| 5,275,475 | 1/1994 | Hartmann et al. . |
| 5,311,431 | 5/1994 | Cao et al. . |
| 5,341,297 | 8/1994 | Zomotor et al. . |
| 5,366,281 | 11/1994 | Littlejohn . |
| 5,402,342 | 3/1995 | Ehret et al. . |
| 5,444,621 | 8/1995 | Matsunaga et al. . |
| 5,480,219 | 1/1996 | Kost et al. ............ 303/146 |
| 5,667,286 * | 9/1997 | Hoying et al. ............ 303/140 |
| 5,720,533 | 2/1998 | Pastor et al. ............ 303/147 |
| 5,746,486 | 5/1998 | Paul et al. ............ 303/146 |

FOREIGN PATENT DOCUMENTS

| | | |
|---|---|---|
| 42 00 061 A1 | 7/1993 | (DE) . |
| 42 23 385 A1 | 1/1994 | (DE) . |
| 42 29 504 A1 | 3/1994 | (DE) . |
| 43 11 077 A1 | 10/1994 | (DE) . |
| 43 14 827 A1 | 11/1994 | (DE) . |
| 0 555 860 A1 | 8/1993 | (EP) . |
| 2 275 551 | 1/1993 | (GB) . |
| 2 263 340 | 7/1993 | (GB) . |
| 2 269 571 | 2/1994 | (GB) . |
| 2 275 312 | 8/1994 | (GB) . |
| 40 52 62213 | 10/1993 | (JP) . |
| 40 60 24304 | 2/1994 | (JP) . |
| 40 60 87421 | 3/1994 | (JP) . |
| 40 61 15418 | 4/1994 | (JP) . |
| 40 61 27354 | 5/1994 | (JP) . |

OTHER PUBLICATIONS

Let Magic Fingers Do The Driving: Wards Auto World; May 1995.

Technoid: Intelligent Brakes Are On The Way; Car and Driver, Aug. 1994.

Toyota Vehicle Stability Control System; Automotive Engineering, Aug. 1995.

Vehicle Dynamics Offers New Level Of Safety: Machine Design, Sep. 1994, p. 52.

Handling Control Systems For Your Car: Popular Electronics; Feb. 1995, pp. 37–39, 93.

VDC, The Vehicle Dynamics Control System of Bosch: A. VanZanten, R. Erhardt and G. Pfaff; Robert Bosch GmbH; No. 950759, pp. 9–26.

Active Stability Control; Junichi Kubokawa, Aisin Seiki Co., Ltd., Electronics & Brake Division; Abstract; Sep. 1995.

Consideration of Lateral and longitudinal Vehicle Stability by Function Enhanced Brake and Stability Control System; Heinz Leffler; SAE #940832; Feb. 28–Mar. 3, 1994.

Control of Vehicle Dynamics: Automotive Engineering; pp. 87–93; May 1995.

Improvement of Vehicle Maneuverability by Direct Yaw Moment Control; Y. Shibahata, K. Shimada and T. Tomari; Society of Automotive Engineers of Japan, Inc.; pp. 464–481.

Spin Control For Cars; Steven Ashley; Mechanical Engineering; pp. 66–68; Jun. 1995.

* cited by examiner

VEHICLE YAW RATE CONTROL WITH YAW RATE COMMAND LIMITING

TECHNICAL FIELD

This invention relates to a vehicle yaw rate control, and more particularly to a method for limiting the yaw rate command consistent with the lateral adhesion capability of the road surface.

BACKGROUND OF THE INVENTION

In general, vehicle yaw rate control systems determine a desired yaw rate based on driver steering angle and other parameters, develop a yaw rate control command, and selectively brake one or more vehicle wheels in accordance with the yaw rate control command so that the vehicle achieves the desired yaw rate. In open-loop systems, the yaw rate control command is determined primarily as a function of the desired yaw rate, whereas in closed-loop systems, the yaw rate control command is determined primarily as a function of the difference, or error, between the desired yaw rate and a measure or estimate of the actual yaw rate. In either type of system, the determination of the desired yaw rate is based on an assumption that the vehicle is operating on dry pavement—that is, a surface having a high lateral coefficient of adhesion. Thus if the surface adhesion capability is not taken into account, the desired yaw rate can easily exceed the surface adhesion capability when the vehicle is operating on a slippery surface such as snow. In such circumstances, the yaw rate control will not be optimal.

Two different approaches for addressing reduction in surface adhesion capability have been considered. The simplest approach is to reduce the control gains, but this also reduces the overall aggressiveness of the control, and is often not favored. The second approach is to estimate the surface adhesion capability during a steering maneuver based on a measure of instantaneous lateral acceleration, and to dynamically limit the desired yaw rate accordingly. While this approach works well when the steering input is substantially constant, it does not work well during transient steering because the desired yaw rate and the lateral acceleration (and therefore, the surface adhesion estimate) are not in phase with each other. This phenomenon can be seen in the graph of FIG. 4A, which depicts a yaw rate limit based on lateral acceleration (solid trace) with the desired yaw rate (broken trace) during a transient steering maneuver on a low adhesion surface. As soon as the steering begins to change significantly, the desired yaw rate begins to lead the yaw rate limit, to the point of being completely out of phase. Accordingly, the robustness of the second approach is limited.

SUMMARY OF THE INVENTION

The present invention is directed to an improved closed-loop vehicle yaw control in which a yaw rate limit based on measured lateral acceleration is used during transient steering maneuvers to dynamically limit a desired yaw rate derived from driver steering input. According to the invention, a preliminary yaw rate limit is computed based on the measured lateral acceleration, and a dynamic yaw rate limit having a proper phase relationship with the desired yaw rate is developed based on the relative magnitudes of the desired yaw rate and the preliminary yaw rate limit. In the preferred embodiment, a two-stage process is used to develop the dynamic yaw rate limit. A first stage yaw rate limit is determined according the lower in magnitude of the desired yaw rate and the preliminary yaw rate limit, and a second stage yaw rate limit (i.e., the dynamic yaw rate limit) is determined according to the relative magnitudes of (1) the desired yaw rate and the second stage yaw rate limit, and (2) the first stage yaw rate limit and the second stage yaw rate limit. The desired yaw rate, as limited by the dynamic yaw rate limit, is then combined with the actual or estimated yaw rate to form a yaw rate error, which in turn, is used to develop a yaw rate command for the vehicle.

BRIEF DESCRIPTION OF THE DRAWINGS

The present invention will now be described, by way of example, with reference to the accompanying drawings, in which.

DETAILED DESCRIPTION

Figure 1:
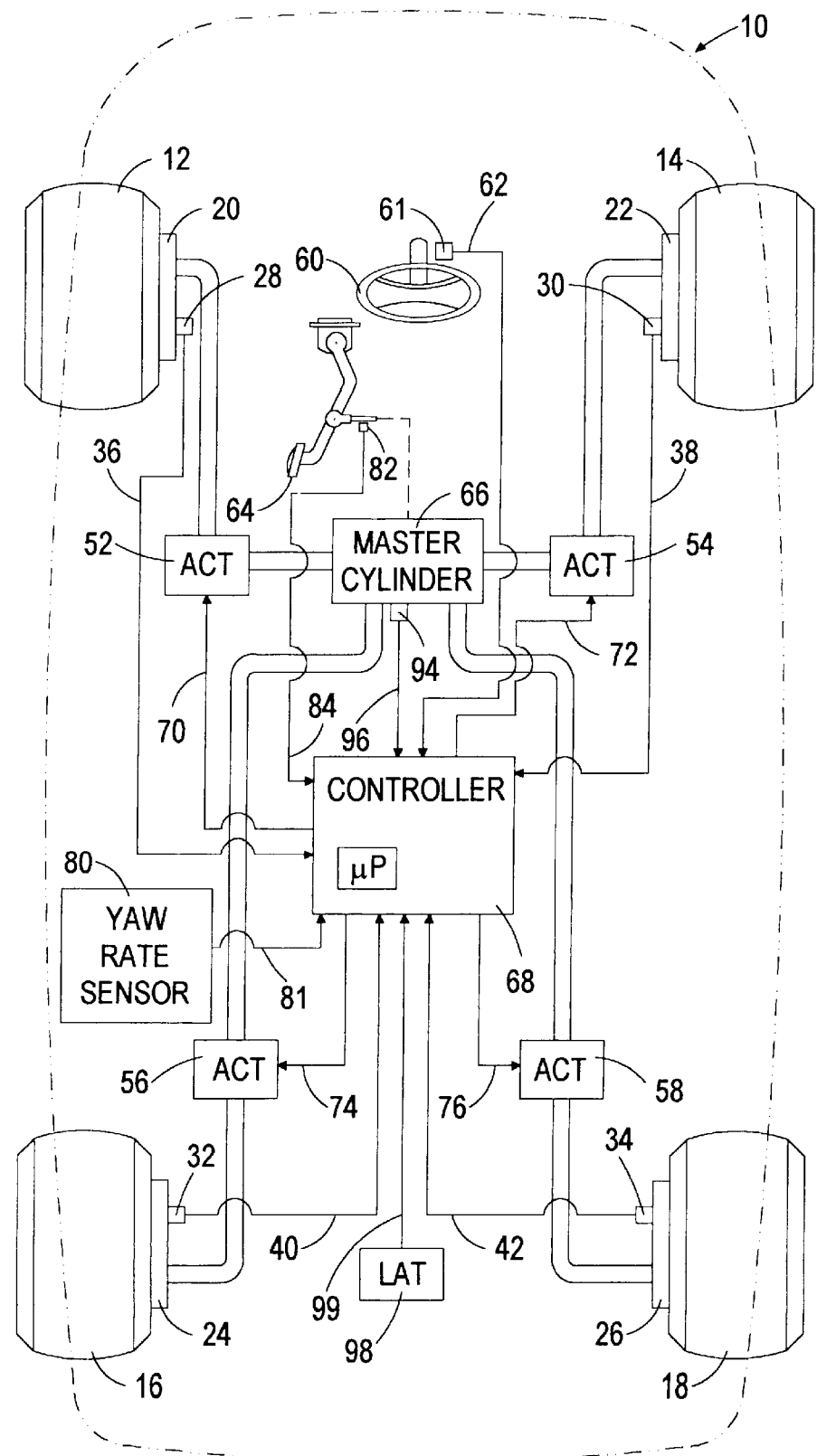
FIG. 1 is a diagram of a vehicle including an electronic controller and associated input and output devices constituting a control system for carrying out an active brake control of vehicle yaw.

FIG. 1 depicts a mechanization of an active brake control according to this invention on a vehicle 10. The vehicle 10 includes a brake system having a micro-processor based controller 68 for controlling the brakes 20, 22, 24, 26 of the respective wheels 12, 14, 16, 18. The controller 68 receives various inputs, including wheel speed signals on lines 36, 38, 40, 42 from respective wheel speed sensors 28, 30, 32, 34; a steering wheel angle signal on line 62 from angle sensor 61; a yaw rate signal on line 81 from yaw rate sensor 80, a brake pedal travel signal on line 84 from pedal travel sensor 82; a master cylinder pressure signal on line 96 from the pressure sensor 94; and a lateral acceleration signal on line 99 from lateral accelerometer 98. The sensors 28, 30, 32, 34, 61, 80, 82, 94, 98 may be implemented with conventional devices in a manner known to those skilled in the art.

Under certain conditions such as wheel lock-up or spinning, or lateral instability, the controller 68 modifies the normal braking of one or more wheel 12, 14, 16, 18 via the respective actuators 52, 54, 56, 58 in order to restore a desired overall operation of the vehicle. In an incipient lock-up condition, the controller 68 commands one or more of the respective actuator(s) 52, 54, 56, 58 to modulate the brake force developed at the wheel(s) experiencing the condition. In a wheel slip condition, the controller 68 commands one or more of the respective actuator(s) 52, 54, 56, 58 to develop brake force at the slipping wheel(s). In a case of lateral instability, the controller 68 commands one or more of the respective actuator(s) 52, 54, 56, 58 to selectively increase or decrease the brake forces generated at the wheels 12, 14, 16, 18 to produce a commanded yaw. In certain applications, the yaw control is limited to the front (driven) wheels 12, 14, allowing the controller to estimate the yaw rate based on the speed differential of the undriven rear wheels; an example of such a control is set forth in the U.S. patent application Ser. No. 09/080,372, assigned to the assignee of the present invention. Exemplary actuators for either mechanization are shown and described in detail in the U.S. Pat. No. 5,366,281, assigned to the assignee of the present invention, and incorporated herein by reference.

Figure 2:
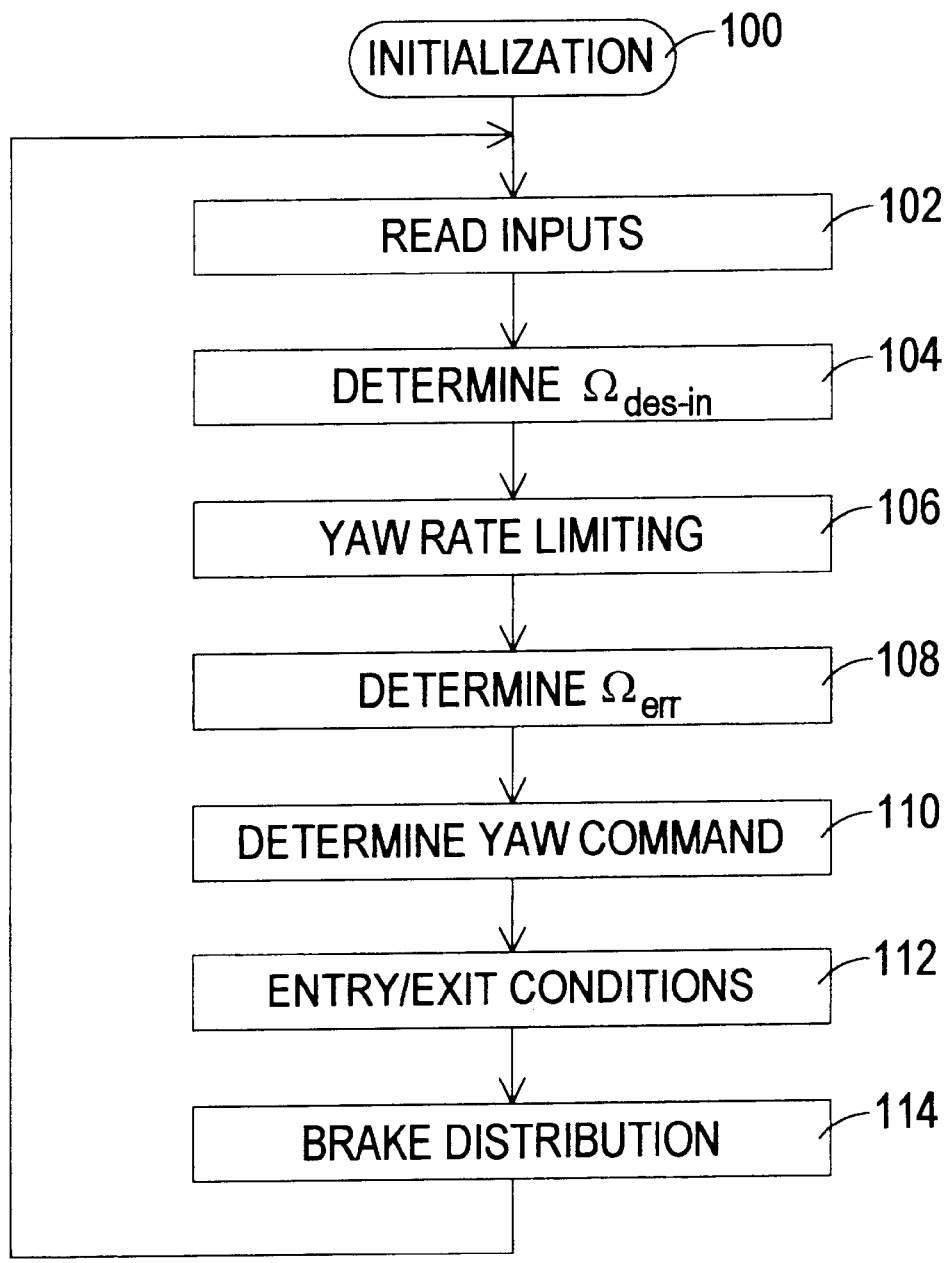
FIG. 2 is a main flow diagram representative of computer instructions executed by the electronic controller of FIG. 1 in carrying out the control of this invention.

FIG. 2 is a main flow diagram representative of computer program instructions executed by the controller 68 of FIG. 1 in carrying out a yaw rate control according to this invention. The block 100 designates a series of initialization instructions executed at the initiation of vehicle operation for appropriately setting the initial condition or state of the various terms and flags referred to below. After reading the various sensor inputs at block 102, the block 104–110 are executed to determine a closed-loop yaw rate control command. Block 104 determines a desired yaw value $\Omega_{des}$ for the vehicle based on various inputs including the vehicle speed $V_x$ and the measured steering wheel angle $\delta$. For example, $\Omega_{des}$ may be determined according to the expression:

$$\Omega_{des}=V_x\delta/(L+K_u V_x^2) \tag{1}$$

where L is wheel base of the vehicle, and $K_u$ is an understeer coefficient. Block 106 concerns the determination and application of yaw rate limiting according to this invention, and is described below in reference to the flow diagram of FIG. 3. For convenience, the pre-limit desired yaw rate from equation (1) is referred to herein as the input desired yaw rate, or $\Omega_{des-in}$, whereas the limited desired yaw rate emanating from block 106 is referred to as the output desired yaw rate, or $\Omega_{des-out}$. Block 108 determines the yaw error $\Omega_{err}$ based on the deviation of the measured or estimated yaw rate from the output desired yaw rate $\Omega_{des-out}$. Block 110 then determines a yaw rate control command based on the yaw rate error and suitable gain factors. Then block 112 decides if active brake control is warranted based on predefined entry and exit conditions. Finally, block 114 carries out an algorithm for distributing braking forces between the left and right vehicle wheels, and block 116 applies corresponding brake control signals to the brake actuators 152–158. Various brake distribution strategies may be utilized, exemplary strategies being disclosed in the U.S. Pat. Nos. 5,667,286 and 5,720,533, both of which are assigned to the assignee of the present invention.

Figure 3:
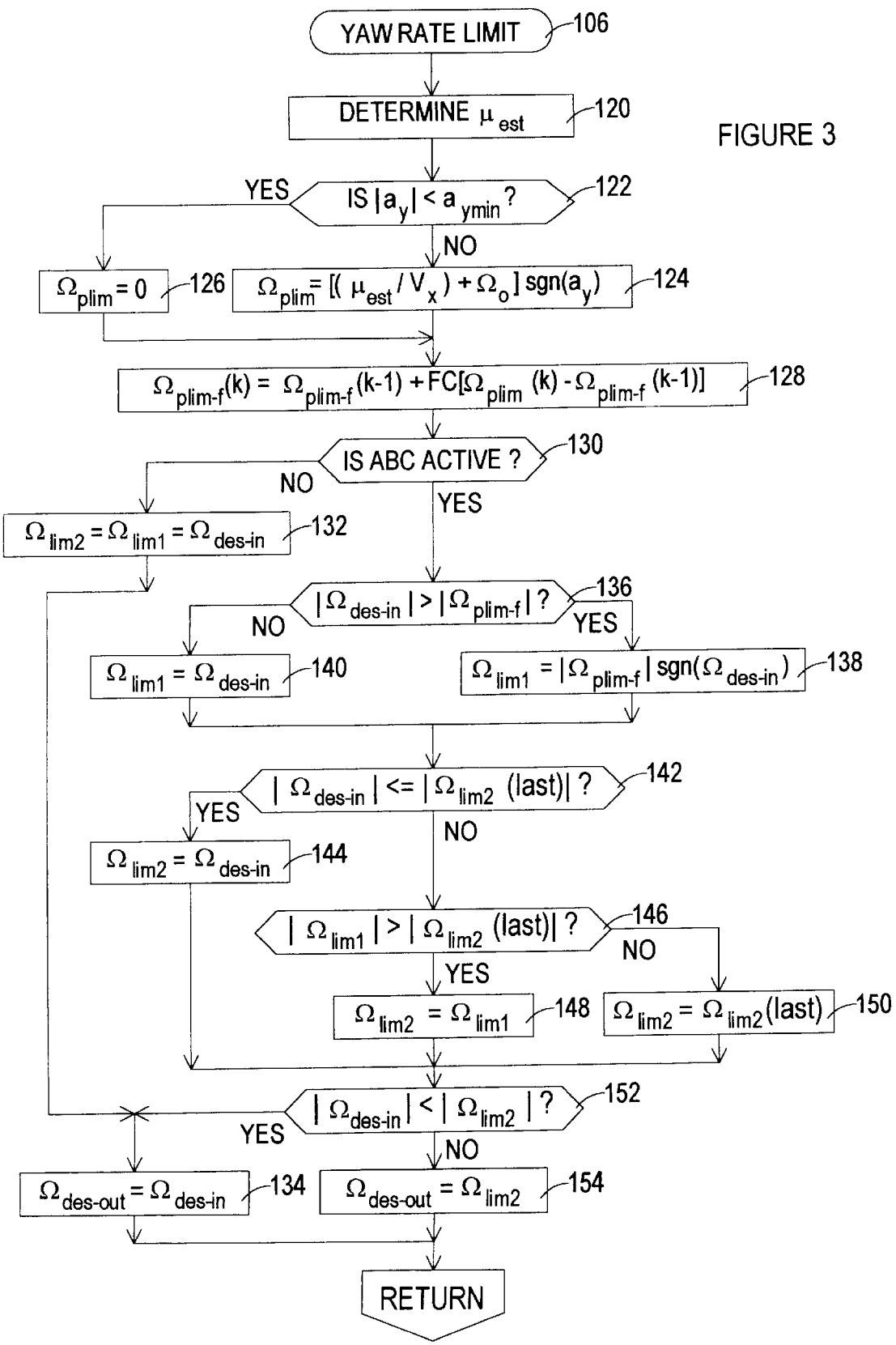
FIG. 3 is a flow diagram setting forth further detail regarding the yaw rate limiting step of FIG. 2.

As indicated above, the flow diagram of FIG. 3 details the development and application of a dynamic yaw rate limit according to this invention. In general, a preliminary yaw rate limit $\Omega_{plim}$ is determined as a function of vehicle speed $V_x$ and a dynamic estimate $\mu_{est}$ of the lateral adhesion capability of the road surface. The adhesion estimate $\mu_{est}$, in turn, is determined as a function of the measured lateral acceleration, possibly in combination with a measure of the longitudinal acceleration. In forming the preliminary yaw rate limit $\Omega_{plim}$, the polarity of the measured lateral acceleration $a_y$ is preserved to ensure proper filtering, and the limit $\Omega_{plim}$ is filtered to form an adhesion-related limit $\Omega_{plim-f}$ having a frequency response similar to that of the input desired yaw rate $\Omega_{des-in}$. The dynamic yaw rate limit is developed in two stages ($\Omega_{lim1}$ and $\Omega_{lim2}$), with the second stage limit $\Omega_{lim2}$ becoming the output desired yaw rate $\Omega_{des-out}$.

To aid in the description of FIG. 3, the first and second stage yaw rate limits $\Omega_{lim1}$ and $\Omega_{lim2}$, along with the preliminary yaw rate limit $\Omega_{plim}$, and the input and output desired yaw rates $\Omega_{des-in}$ and $\Omega_{des-out}$ for a steering maneuver on a low adhesion road surface are graphically depicted in FIGS. 4A–4D. The four graphs have the same scale, with the time points $t_0-t_8$ dividing the horizontal axis into a series of eight time intervals, designated as T1–T8. For convenience, the time intervals T1–T8 are omitted from FIGS. 4B–4D.

Referring to FIG. 3, the block 120 is first executed to determine an estimate $\mu_{est}$ of the lateral adhesion capability of the road surface, based on sensed vehicle acceleration, according to the expression:

$$\mu_{est}=\mu_0+K^*a_y \tag{2}$$

where $\mu_0$ is a adhesion coefficient offset value, and K is a gain factor. The terms $\mu_0$ and K may be calibrated to create an adhesion estimate $\mu_{est}$ that is somewhat higher than strictly indicated by the lateral acceleration $a_y$ so that the desired yaw rate is not unnecessarily limited by the control. If the system also includes a longitudinal accelerometer, $\mu_{est}$ may alternatively be determined according to the expression:

$$\mu_{est}=\mu_0+K(a_x^2+a_y^2)^{1/2} \tag{3}$$

where $(a_x^2+a_y^2)^{1/2}$ is the resultant vector of the lateral acceleration $a_y$ and the longitudinal acceleration $a_x$.

Once the adhesion estimate pest is determined, the blocks 122–126 are executed to determine the value of the preliminary yaw rate limit $\Omega_{plim}$. If the magnitude of the lateral acceleration $a_y$ is less than a minimum reference lateral acceleration $a_{ymin}$, such as 0.1 g, the limit $\Omega_{plim}$ is set equal to zero. Otherwise, the limit $\Omega_{plim}$ is determined according to the expression:

$$\Omega_{plim}=[(\mu_{est}/V_x)+\Omega_0]^*sgn(a_y) \tag{4}$$

where $\Omega_0$ is a yaw rate limit offset value. Thereafter, the yaw rate limit $\Omega_{plim}$ is filtered at block 128 by a first-order low-pass filter to form the filtered limit $\Omega_{plim-f}$ as follows:

$$\Omega_{plim-f}(k)=\Omega_{plim-f}(k-1)+FC^*[\Omega_{plim}(k)-\Omega_{plim-f}(k-1)] \tag{5}$$

where FC is a filter constant having a value of 0.02, for example, and the designations (k) and (k–1) refer to the current and previous control loop values, respectively, of the terms $\Omega_{plim}$ and $\Omega_{plim-f}$.

Figure 4A:
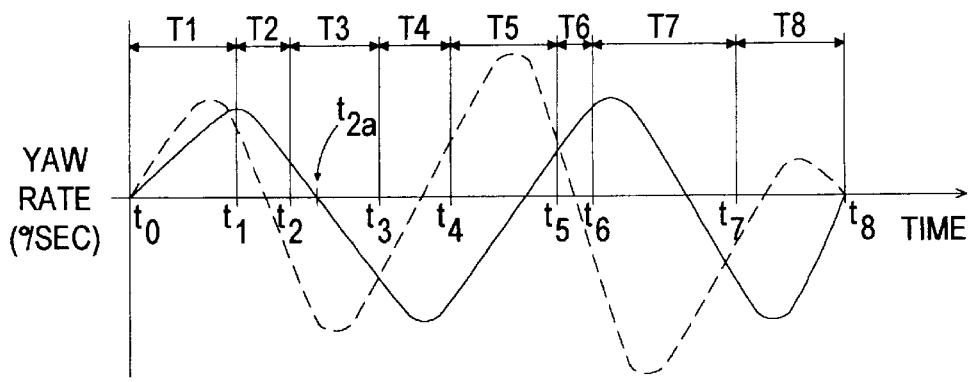
FIGS. 4A–4D graphically depict the development of a dynamic yaw rate limit according to this invention for a steering maneuver on a low adhesion road surface.
Figure 4B:
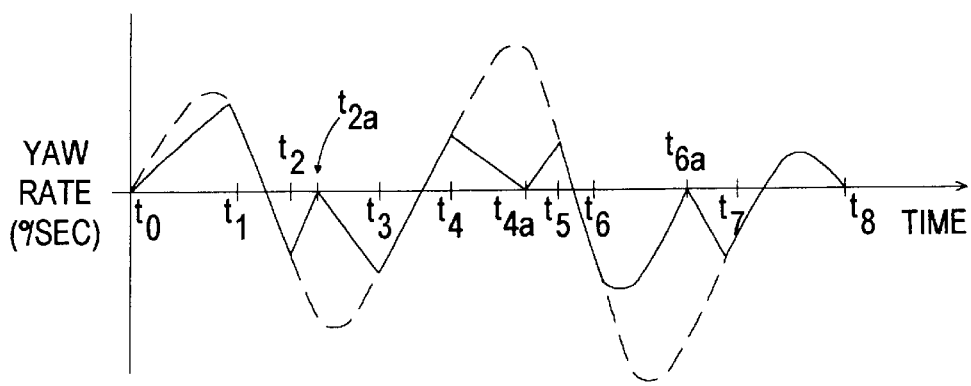
Figure 4C:
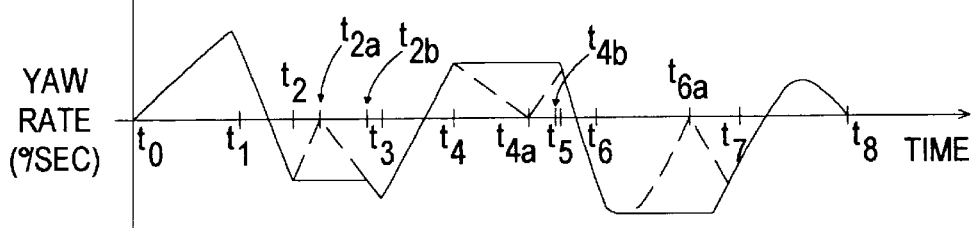

As indicated above, and as seen in FIG. 4A, the preliminary yaw rate limit $\Omega_{plim-f}$ becomes substantially out of phase with the input desired yaw rate $\Omega_{des-in}$ during a steering maneuver, particularly on a low adhesion surface such as snow. As explained below, the first and second stage limits $\Omega_{lim1}$ and $\Omega_{lim2}$ are developed based on the relative magnitudes of $\Omega_{des-in}$ and $\Omega_{plim-f}$ to form a dynamic yaw rate limit that is in-phase with the desired yaw rate $\Omega_{des-in}$, and retains the adhesion capability information contained in the preliminary yaw rate limit $\Omega_{plim-f}$. In the illustrated embodiment, the second stage limit $\Omega_{lim2}$ becomes the output desired yaw rate $\Omega_{des-out}$, which as described above in reference to FIG. 2, is combined with the actual or estimated yaw rate to form the yaw rate error $\Omega_{err}$.

Referring to FIG. 3, the block 130 determines if active brake control (ABC) is active. If not, the blocks 132 and 134 are executed to set the first and second stage yaw rate limits $\Omega_{lim1}$ and $\Omega_{lim2}$ as well as the output desired yaw rate $\Omega_{des-out}$ equal to the input desired yaw rate $\Omega_{des-in}$. If ABC is active, blocks 136–140 set the first limit term $\Omega_{lim1}$ equal to the lesser in magnitude of the input desired yaw rate $\Omega_{des-in}$ and the filtered preliminary yaw rate limit $\Omega_{plim-f}$. Significantly, the SGN function of block 138 preserves the polarity of the input desired yaw rate $\Omega_{des-in}$ when $\Omega_{lim1}$ is determined according to $\Omega_{plim-f}$, thereby ensuring that $\Omega_{lim1}$ is in phase with $\Omega_{des-in}$. In the exemplary steering maneuver of FIG. 4, the limit $\Omega_{lim1}$ is depicted by the solid trace of FIG. 4B. As seen in the graph, limit $\Omega_{lim1}$ deviates from the input desired yaw rate $\Omega_{des\text{-}in}$ during the time intervals T3, T5 and T7. However, it is also seen that in such time intervals, the magnitude information of $\Omega_{plim\text{-}f}$ is not correctly represented due to the out-of-phase relationship of $\Omega_{plim\text{-}f}$ and $\Omega_{des\text{-}in}$. In fact, there are several instances where $\Omega_{plim\text{-}f}$ and $\Omega_{des\text{-}in}$ are changing in opposite directions; see, for example, the first part of time interval T3 ($t_2$–$t_{2a}$), the entire time interval T5, and the last part of time interval T7 ($t_{6a}$–$t_7$).

Figure 4D:
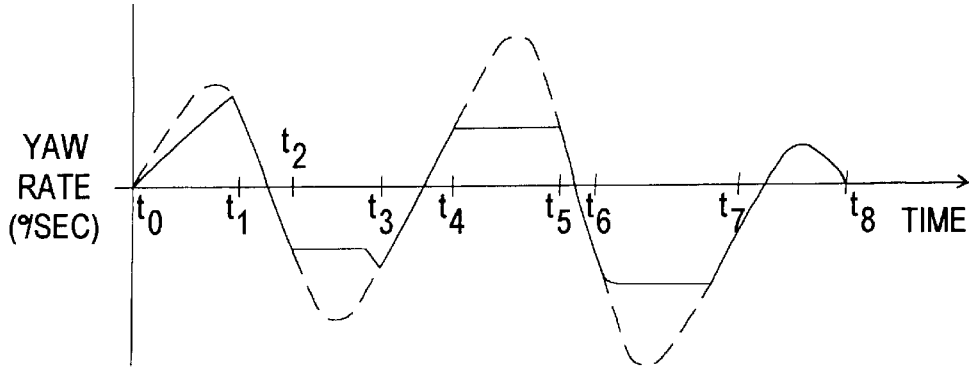

Accordingly, the purpose of the second stage limit $\Omega_{lim2}$ is to modify the first stage limit $\Omega_{lim1}$ in a manner to retain both the magnitude information of $\Omega_{plim\text{-}f}$ and the phase information of $\Omega_{des\text{-}in}$. This is accomplished by tracking the peak value of $\Omega_{lim1}$ within the envelope or boundary of the input desired yaw rate $\Omega_{des\text{-}in}$. This is graphically depicted in FIG. 4C, where the second stage limit $\Omega_{lim2}$ is shown by the solid trace, and the broken trace shows the omitted excursions of the first stage limit $\Omega_{lim1}$. The second stage limit $\Omega_{lim2}$ becomes the output desired yaw rate $\Omega_{des\text{-}out}$, and is shown in FIG. 4D (solid trace) along with the input desired yaw rate $\Omega_{des\text{-}in}$ (broken trace). Thus, it can be seen that the input desired yaw rate $\Omega_{des\text{-}in}$ is dynamically limited based on the road surface capability information contained in the preliminary yaw rate limit $\Omega_{plim\text{-}f}$.

Referring to FIG. 3, the block 142 compares the magnitude of the input desired yaw rate $\Omega_{des\text{-}in}$ to the magnitude of the previous (last) value of the second limit term $\Omega_{lim2}$ (last). If $|\Omega_{des\text{-}in}|$ is less than or equal to $|\Omega_{lim2}(\text{last})|$, the driver is commanding a yaw rate within the previously determined surface capability, and block 144 is executed to set $\Omega_{lim2}$ equal to $\Omega_{des\text{-}in}$. Examples of this occur in the latter parts of time intervals T5 and T7. However, if $|\Omega_{des\text{-}in}|$ is greater than $|\Omega_{lim21}(\text{last})|$, the driver is commanding a yaw rate larger than the previously determined surface capability, and block 146 is executed to determine if the magnitude of $\Omega_{lim1}$ is greater than the magnitude of $\Omega_{lim2}(\text{last})$. If not, the block 150 holds the previous value of the second stage limit $\Omega_{lim2}$. Examples of this occur in the first parts of time intervals T3, T5 and T7. If $|\Omega_{lim1}|$ is greater than $|\Omega_{lim2}(\text{last})|$, the block 148 sets the second stage limit $\Omega_{lim2}$ equal to the first stage limit $\Omega_{lim1}$ to reflect the higher limit value. An example of this occurs in the latter part of time interval T3.

Finally, blocks 134 and 152–154 apply the second limit term $\Omega_{lim2}$ to the input desired yaw rate $\Omega_{des\text{-}in}$ to form the output desired yaw rate $\Omega_{des\text{-}out}$. In other words, the output desired yaw rate $\Omega_{des\text{-}out}$ is set equal to the lesser of the input desired yaw rate $\Omega_{des\text{-}in}$ and the second limit term $\Omega_{lim2}$. As described above, the output desired yaw rate $\Omega_{des\text{-}out}$ is then used in combination with the measured or estimated yaw rate to determine the yaw rate error, and the yaw rate control command.

In summary, the control of this invention dynamically limits the desired yaw rate based on a limit derived from the measured lateral acceleration of the vehicle during a steering maneuver. This in turn limits the yaw rate control command so as to tailor the yaw control in accordance with the adhesion capability of the road surface. As indicated above, it is expected that various modifications of the illustrated embodiment will occur to those skilled in the art, and in this regard, it will be understood that the scope of this invention is not necessarily limited by the illustrated embodiment, but instead is defined by the appended claims.

What is claimed is:

1. A limited yaw rate control method in which vehicle wheels are differentially braked in response to a yaw command based on a deviation of a vehicle yaw rate from a desired yaw rate, the improvement comprising the steps of:

measuring a lateral acceleration of the vehicle;

developing a preliminary yaw rate limit based on the measured lateral acceleration;

forming a first stage yaw rate limit according to the lesser in magnitude of the desired yaw rate and the preliminary yaw rate limit, while preserving the polarity of the desired yaw rate;

forming a second stage yaw rate limit according to a peak excursion of the first stage yaw rate limit; and limiting the desired yaw rate according to the lesser in magnitude of the second stage yaw rate limit and the desired yaw rate.

2. The improvement of claim 1, wherein the peak excursion of the first stage yaw rate limit is identified by detecting a reduction in magnitude of said first stage yaw rate limit within an envelope defined by the desired yaw rate.

3. The improvement of claim 1, including the steps of:

preserving the polarity of the measured lateral acceleration in developing said preliminary yaw rate limit; and filtering said preliminary yaw rate limit so that said preliminary yaw rate limit has a frequency response similar to a frequency response of said desired yaw rate.

4. The improvement of claim 1, including the step of:

setting said first and second stage yaw rate limits equal to said desired yaw rate when said yaw rate control is deactivated.

5. A limited yaw rate control method in which vehicle wheels are differentially braked in response to a yaw command based on a deviation of a vehicle yaw rate from a desired yaw rate, the improvement comprising the steps of:

measuring a lateral acceleration of the vehicle;

developing a preliminary yaw rate limit based on the measured lateral acceleration;

forming a first stage yaw rate limit according to the lesser in magnitude of the desired yaw rate and the preliminary yaw rate limit, while preserving the polarity of the desired yaw rate;

forming a second stage yaw rate limit according to the greater in magnitude of the first stage yaw rate limit and a previous value of said second stage yaw rate limit; and limiting the desired yaw rate according to the lesser in magnitude of the second stage yaw rate limit and the desired yaw rate.

6. The improvement of claim 5, wherein the peak excursion of the first stage yaw rate limit is identified by detecting a reduction in magnitude of said first stage yaw rate limit within an envelope defined by the desired yaw rate.

7. The improvement of claim 5, including the steps of:

preserving the polarity of the measured lateral acceleration in developing said preliminary yaw rate limit; and filtering said preliminary yaw rate limit so that said preliminary yaw rate limit has a frequency response similar to a frequency response of said desired yaw rate.

8. The improvement of claim 5, including the step of:

setting said first and second stage yaw rate limits equal to said desired yaw rate when said yaw rate control is deactivated.

* * * * *